United States Patent [19]
Burgess et al.

[11] Patent Number: 5,255,441
[45] Date of Patent: Oct. 26, 1993

[54] PRISM POLE FOR A SURVEYING SYSTEM

[76] Inventors: Bradley C. Burgess, 527 Pembrook Ct. N., Crystal Lake, Ill. 60014; Joseph D. Esker, P.O. Box 224, Teutopolis, Ill. 62467

[21] Appl. No.: 17,813

[22] Filed: Feb. 16, 1993

[51] Int. Cl.⁵ .............................. G01C 15/08
[52] U.S. Cl. .......................... 33/295; 33/296
[58] Field of Search ........... 33/293, 294, 295, 296; 359/515, 553, 831, 833; D10/61, 66, 74

[56] References Cited

U.S. PATENT DOCUMENTS

| | | | |
|---|---|---|---|
| 2,169,533 | 8/1939 | Kasten | 33/295 |
| 2,972,053 | 2/1961 | Anderson | 33/293 |
| 4,339,880 | 7/1982 | Hall | 33/293 |
| 4,803,784 | 2/1989 | Miller | 33/293 |
| 4,879,816 | 11/1989 | Sierk | 33/295 |
| 4,899,452 | 2/1990 | Schater | 33/296 |

FOREIGN PATENT DOCUMENTS

| | | | |
|---|---|---|---|
| 0011308 | 2/1981 | Japan | 33/293 |
| 0035411 | 3/1983 | Japan | 33/293 |

Primary Examiner—Thomas B. Will
Attorney, Agent, or Firm—Rockey, Rifkin and Ryther

[57] ABSTRACT

The prism pole consists of an extensible aluminum pole that can be adjusted between a length of 30 and 47 inches. The pole has a hardened steel point on one end thereof and a prism assembly on its opposite end. The prism pole also has a steel point mounted to the prism assembly such that the pole can be turned "upside down" placing the prism assembly approximately 4 inches from the point being measured. To assist in plumbing the prism pole, two level vials are provided, the first being observable when the pole is in the upright position and the second being observable when the pole is in the upside down position.

2 Claims, 1 Drawing Sheet

PRISM POLE FOR A SURVEYING SYSTEM

BACKGROUND OF THE INVENTION

The invention relates, generally, to surveying systems and, more particularly, to an improved prism pole for such systems.

Surveying systems are used for mapping and plotting purposes by identifying the location of any point on a three dimensional coordinate system as graphically illustrated in FIG. 1. The typical surveying system consists of a prism pole 1 supporting a prism assembly 5 for positioning the prism over the point P to be located, and an electronic distance measuring device 3 for measuring to the point and automatically assigning three dimensional coordinates. These coordinates can then be transferred to a computer for design or mapping purposes.

Prism poles constructed of a high strength aluminum, typically consist of an outer-bottom section and at least one inner telescoping section. The outer section having a hardened steel point on the bottom end thereof to permit its being precisely positioned on the point being measured. A prism assembly, which is mounted on the top end of the pole, serves as the target for the infrared beam generated by the electronic measuring device, reflects the beam back to the measuring device.

In order to ensure accurate measurements, the prism pole must be held plumb with the prism assembly aligned directly above the point being measured. Because the typical prism pole is at least 56 inches long when fully collapsed, it is difficult to keep the prism pole plumb and therefore the prism assembly over the point being measured. To assist in plumbing the prism pole, most poles are provided with a level vial observable by the operator while positioning the prism pole. Unfortunately, these level vials are only accurate to ±45 minutes of arc. Any error in the vertical alignment of the prism pole will result in measurement errors. Moreover, the longer the prism pole, the greater the measurement errors will be as illustrated in FIG. 2, where the error in vertical alignment is shown by angle $\alpha$.

Existing prism poles are available in a variety of sizes that typically extend to lengths of between 4 and 15½ feet. Longer prism poles are needed in areas where hills or other obstacles would otherwise obstruct a short prism pole. The applicant has recognized that there are applications where relatively flat, unobstructed surfaces are measured, for example, the inside of buildings or paved surfaces. For these applications, long prism poles are not required and their use increases the risk that the pole will be misaligned, thereby introducing unnecessary errors. For these applications, a more easily positioned pole that minimizes the error due to misalignment is desired.

SUMMARY OF THE INVENTION

The prism pole of the invention consists of an extensible aluminum pole that can be adjusted between a length of 30 and 47 inches. The pole has a hardened steel point on one end and a prism assembly on the opposite end similar to a standard prism pole. Unlike a conventional pole, the prism pole of the invention also has a hardened steel point mounted to the top of this prism assembly such that the pole can be turned "upside down", thereby placing the prism assembly 4 inches from the point being located. To assist in plumbing this prism pole, two level vials are provided, the first being observable when the pole is in the upright position and the second being observable when the pole is in the upside down position.

DETAILED DESCRIPTION OF THE INVENTION

Figure 3:
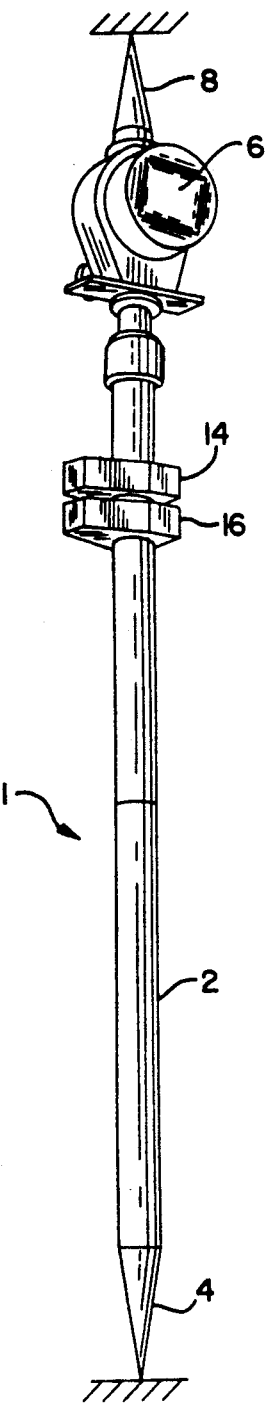
FIG. 3 shows the prism pole of the invention.

Referring more particularly to FIG. 3, the prism pole of the invention is shown generally at 1 and consists of a telescoping pole 2 having a hardened steel point 4 formed at the bottom thereof for locating the pole on the point being located. In this position a prism assembly 6, mounted to the top of pole 2, can be adjusted to a height of between 30 and 47 inches.

A second hardened steel point 8 is mounted to the top of prism assembly 6. By turning the pole 2 upside down and placing point 8 on the point being located, the prism assembly 6 will be at a height of only four inches. This orientation is suitable for any application in which there are no obstructions between the pole and the electronic measuring device.

A first level vial 14, mounted on the pole 2, is observable when the pole is in the position of FIG. 3. A second level vial 16 is also mounted on pole 2 and is observable when the pole is in the upside down position with point 8 on the point being located. Thus, the operator is assisted in plumbing the pole in either orientation.

Figure 1:
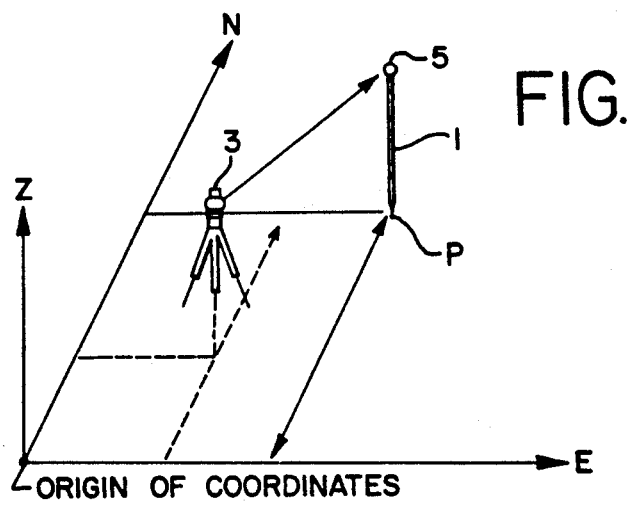
FIG. 1 shows a typical surveying system.
Figure 2:
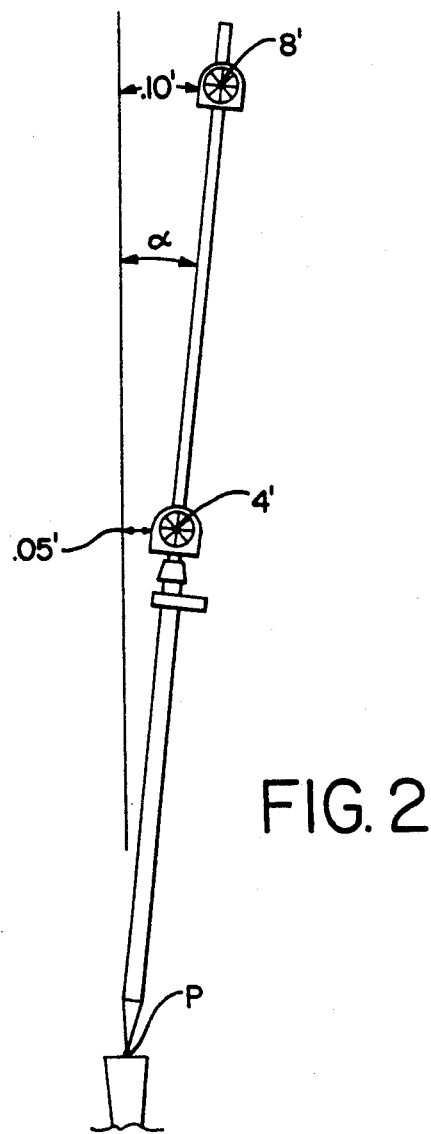
FIG. 2 shows the error that can result from a misaligned prism pole.

The prism pole of the invention allows conventional measurement when used with point 4 on the point being measured and allows high accuracy measurement when used with point 8 on the point being located. The advantage of such a system can be best explained with reference to FIG. 2. If the pole 2 is at any angle $\alpha$ greater than zero, the measurement error will increase the farther the prism assembly 4', 8' is from the point P being located. Thus, the prism assembly of the invention, being at a height of only 4 inches, minimizes measurement error.

While the invention has been described in some detail with respect to the figures, it will be appreciated that numerous changes in the construction and details of the invention can be made without departing from the spirit and scope of the invention.

What is claimed is:

1. An improved prism pole for use in a surveying system, comprising:
    a) a pole having a first point at one end thereof and a prism assembly at the opposite end thereof, said first point being engageable with a point being located to orient the prism assembly in a first position;
    b) a second point mounted adjacent the prism assembly, said second point being engageable with the point being located to orient the prism assembly in a second position; and
    c) first and second level vials mounted on said pole such that the first level vial is observable when said prism assembly is in the first position and said second vial is observable when said prism assembly is in the second position.

2. The prism pole according to claim 1, wherein the pole is telescopically adjustable in length.

* * * * *